INVENTORS
F. K. DRIVER
G. J. EASTON
BY
Cameron, Kirkam & Sutton
ATTORNEYS

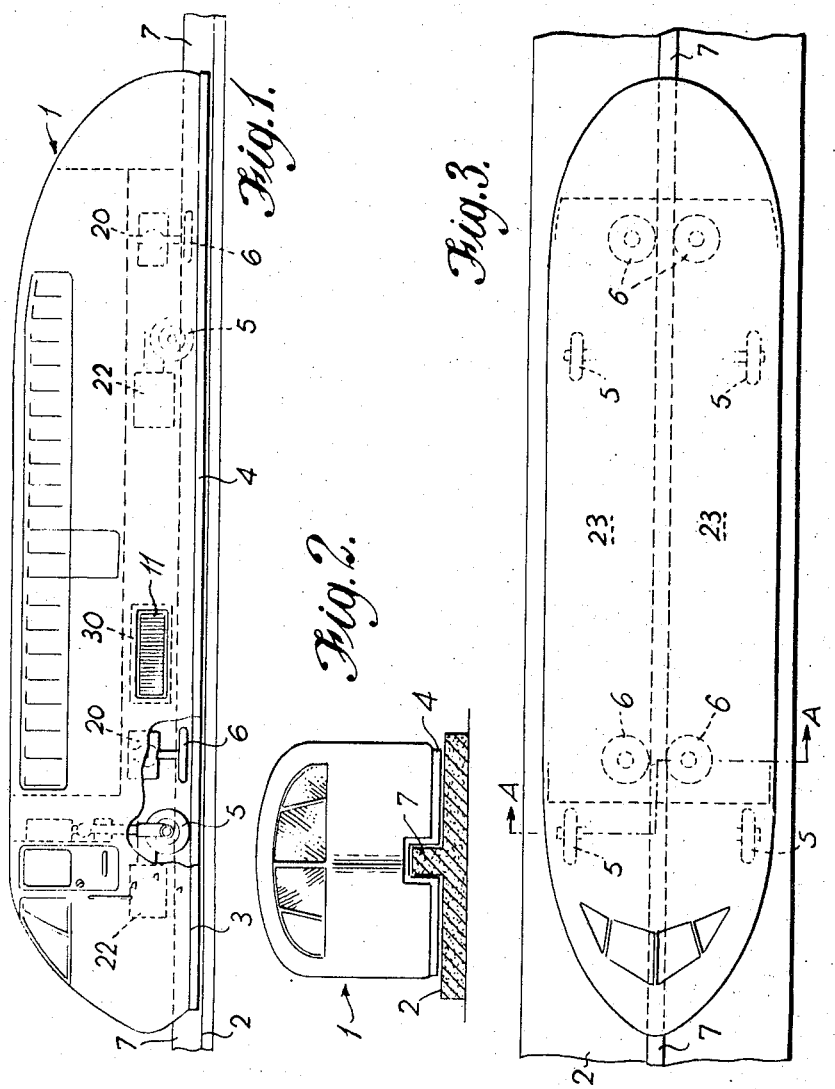

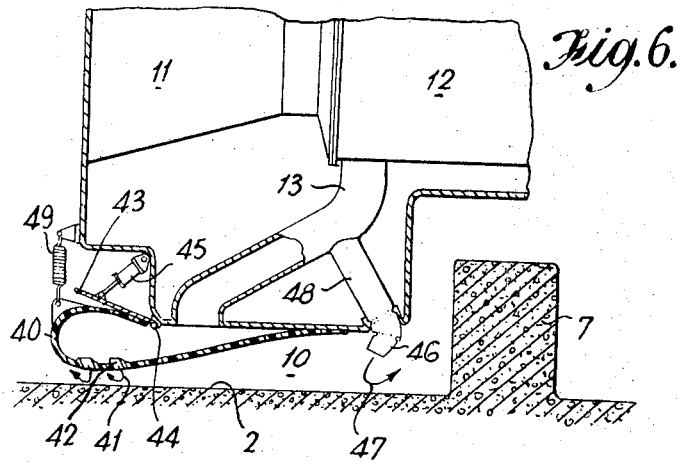
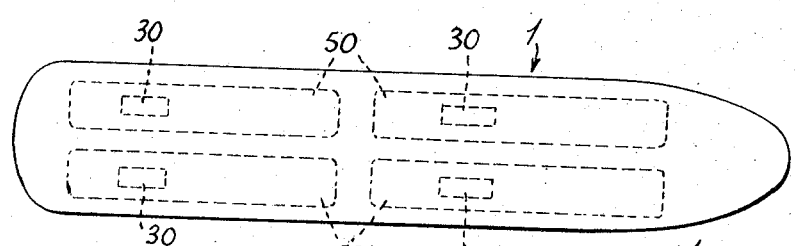
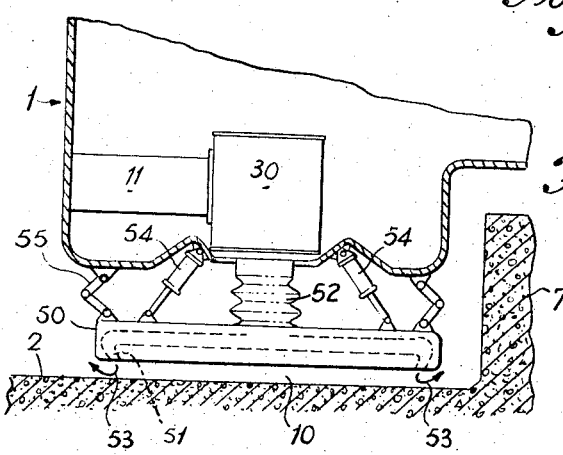

United States Patent Office 3,369,497
Patented Feb. 20, 1968

3,369,497
VEHICLES FOR TRAVELLING OVER
LAND SURFACES
Frederick Kenneth Driver, Lymington, and Geoffrey John Easton, Highcliffe, Christchurch, England, assignors to Hovercraft Development Limited, London, England, a British company
Filed July 13, 1965, Ser. No. 471,610
Claims priority, application Great Britain, July 17, 1964, 29,375/64
10 Claims. (Cl. 104—23)

ABSTRACT OF THE DISCLOSURE

A vehicle for travelling either along a concrete track where it is supported by air cushions, or along a roadway where it is supported by retractable road wheels. The air cushions may be formed beneath retractable pads, and dampers may be provided to restrain upward movement of the pads. The air cushions may be contained by flexible skirts, by air curtains, or by flexible skirts and air curtains in combination.

This invention relates to vehicles for travelling over land surfaces and relates particularly to gas cushion vehicles, that is to say, to vehicles of the type which can be supported relative to a surface by at least one cushion of pressurised gas formed and contained beneath the vehicle body.

It has been proposed to support gas cushion vehicles on a track, the track also serving to guide the vehicle. One of the limitations of this arrangement is a limitation experienced by other vehicles that follow tracks, such as rail-cars and monorails, in that they are only available for transportation on routes provided with the tracks. In order to proceed to a destination which is not in the immediate vicinity of the track, it is necessary to provide other means of transport such as an omnibus which can effect transportation from a stopping place adjacent the track to the required final destination. The track-following vehicle must therefore halt at the stopping place to enable passengers and goods to be transferred to the other means of transport. The delays and labour thus involved naturally tend to off-set the speed advantages of the track-following vehicle and the invention seeks to provide a vehicle whereby these transfers become unnecessary.

According to the invention, a vehicle for travelling over land surfaces and adapted to operate thereover in two regimes, namely, a first regime in which the vehicle moves along a track and is supported during this movement by at least one cushion of pressurised gas formed and contained beneath the vehicle body, and a second regime in which the vehicle moves along a roadway and is then supported, at least in part, by wheels mounted on the vehicle body, the vehicle comprising a vehicle body, means for forming and containing said gas cushion, guiding means which co-operate with said track to constrain movement of the vehicle to movement along said track and wheels retractable towards the vehicle body and which are extended therefrom to contact said roadway.

Embodiments of the invention will now be described by way of example, with reference to the accompanying diagrammatic drawings wherein:

FIGURE 1 is a side elevation of a vehicle according to one embodiment,

FIGURE 2 is a front view of the vehicle illustrated in FIGURE 1,

FIGURE 3 is a plan view of the vehicle illustrated in FIGURE 1,

Figure 4:
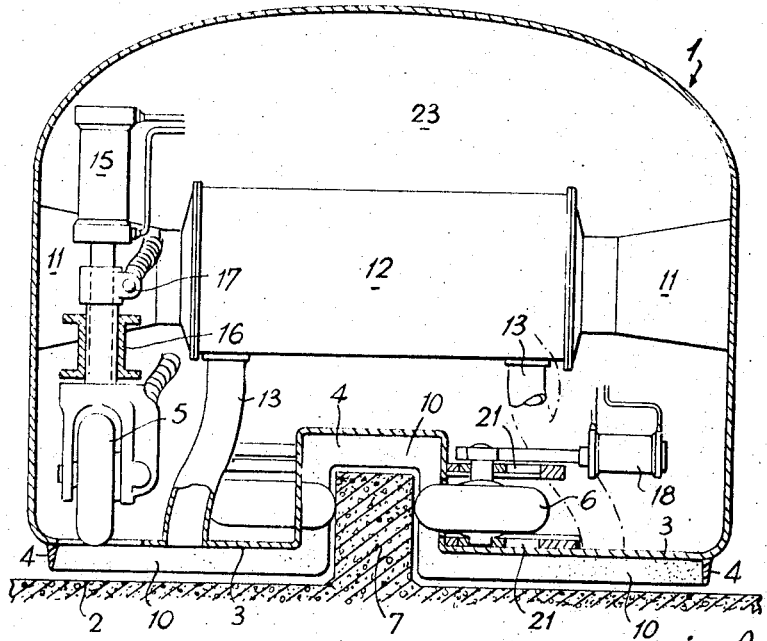
Figure 5:
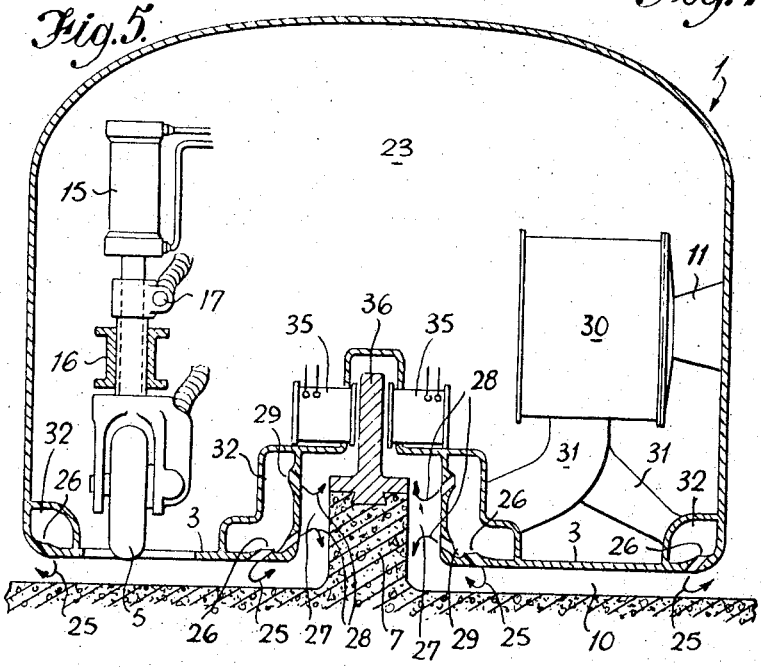

FIGURE 4 is a vertical cross-section, with parts removed, of the lower part of the vehicle on the line A—A of FIGURE 3, FIGURE 5 is a cross-section similar to that of FIGURE 4 but illustrating another embodiment, FIGURE 6 is a fragmental cross-section illustrating a modification of the vehicle illustrated in FIGURE 4, FIGURE 7 is a plan view of a modified vehicle, and FIGURE 8 is a fragmental cross-section of the vehicle of FIGURE 7.

With reference to FIGURES 1 to 4, a vehicle 1 is shown, in one regime, moving along a track 2 and is supported during this movement by a cushion 10 of pressurised air formed beneath the vehicle body 3 and contained thereunder by a flexible wall structure 4 extending around the periphery of the vehicle body. In this example the wall structure 4 is formed from rubber sheet but suitable alternatives are rubberised fabric and neoprene. The air cushion 10 is formed by drawing in atmospheric air through intakes 11, raising its pressure in a compressor 12 and discharging the compresssed air, by way of ducts 13, to the underside of the vehicle body.

The track 2 is of concrete and includes an upright-disposed guide strip 7 and the vehicle 1 is constrained to movement along the track by fore and aft guide or caliper wheels 6 which straddle the strip 7 so as to co-operate with and roll along the side faces of the strip. The vehicle 1 is propelled along the track 2 by driving the caliper wheels 6 through engine and gear box units 20. The caliper wheels 6 are also movable towards and away from the side faces of the strip 7 by hydraulic jacks 18. The wheels 6 are guided during this movement by pairs of spaced guide strips 21 which locate the axles of the wheels therebetween.

The vehicle 1 carries fore and aft disposed roadwheels 5, located in bearings 16, and are movable towards and away from the vehicle body 3 by hydraulic jacks 15. As shown in FIGURES 1 to 4, the roadwheels 5 are in their retracted positions, i.e., clear of the track 2, as the vehicle 1 is here supported wholly by the air cushion 10.

For operation of the vehicle 1 in a second regime, i.e. on a roadway, at least the fore-disposed roadwheels 5 are steerable, through steering arms 17 (FIGURE 4 only) and all of the roadwheels 5 are drivable through engine and gear box units 22 (FIGURE 1 only).

To preserve the integrity of the air cushion 10, the roadwheels 5 and caliper wheels 6 are mounted in an air-tight enclosure 23. In operation, the vehicle is capable of transition from the track regime to roadway regime without the vehicle stopping. For example, considering the vehicle operating as in FIGURE 4, that is, supported on the track 2 by the air cushion 10, when the vehicle approaches a roadway (or similar way) at the end of the track 2 the wheels 5 are moved downward on to the track by the hydraulic jacks 15. At the end of the track 2 the vehicle is free of the constraining effect of the strip 7 and can be driven and manoeuvred on the roadway as an ordinary road vehicle. The air cushion 10 can either be maintained, preferably at a reduced pressure, to assist the wheels 5 in supporting the vehicle, or the compressor 12 can be shut down and the vehicle is then wholly supported by the wheels 5.

On the reverse transition, as the vehicle approaches the beginning of the track 2, the compressor 12 is started up to form the air cushion 10 (if it has been shut down). The vehicle is steered, through the front wheels 5, so that the caliper wheels 6 can engage with the beginning of the guiding strip 7 on the track. To facilitate this engagement and to avoid an undue reduction in speed, the caliper wheels can be retracted by the hydraulic jacks 18 and the end of the guiding strip 7 can be made thinner than the remainder thereof. Once the vehicle is over the guiding strip 7 the caliper wheels 6 are brought into engagement to locate the vehicle relative to the track 2. If the pressure of the cushion 10 is not at the pressure required for operation on the track then cushion pressure is increased before the wheels 5 are retracted into the vehicle body 3.

FIGURE 5 illustrates an alternative embodiment wherein the vehicle 1 is supported by a pair of air cushions 10 contained at their peripheries by curtains 25 of moving air issuing from supply ports 26 formed in the bottom of the vehicle body. The vehicle 1 is maintained in correct relationship with the guiding strip 7 by cushions 27 of pressurised air bounded by curtains 28 of moving air issuing from supply ports 29 formed in the bottom of the vehicle body. The air forming the air curtains 25 and 28 and also the cushion 10 is supplied by air compressors 30 through ducting 31 and 32. Retractable roadwheels 5 and their associated equipment are provided.

FIGURE 5 also illustrates an alternative form of propulsion, using a linear motor. The coils 35 of the motor are mounted in the vehicle body and are positioned on either side of a metal conductor rail 36 attached to the upper edge of the guiding strip 7.

It will be seen that the vehicle 1 readily operates in one of two different regimes as requires and can pass from one regime to the other quickly and easily without stopping. The vehicle can thus operate between track termini at high speed, being guided by the track with the safety and convenience this provides and can then operate away from the termini in a manner similar to that of a normal road vehicle, with the mobility of such a vehicle. In a practical application, passengers intending to board an aircraft are conveyed from a central assembly point by roadway to the beginning of the track 2, then conveyed at high speed on the track to the airport and then finally conveyed within the airport, possibly direct to the aircraft, all by the same vehicle.

An air cushion 10 can be contained by a combination of a flexible wall structure and an air curtain. For example, the vehicle 1 of FIGURE 4 could have air curtains across the front and rear of the cushion 10, instead of the structure 4 shown. This is particularly advantageous in providing an air-tight seal round the guiding strip 7. Alternatively, or in addition, flexible wall structures 4 can be used to contain the cushion 10 for the upper part only of its periphery, the remainder thereof being contained by air curtains. Further flexible wall structures and/or air curtains can be provided for subdividing the cushion 10 in the known manner.

With reference now to FIGURE 6, the upper part of the outboard side of a cushion 10 is contained by a hollow, inflatable wall structure 40 attached to the vehicle body and having a cross-sectional profile of the form disclosed in co-pending application Ser. No. 316,852, now Patent No. 3,291,237, and the lower part thereof by a spaced pair of air curtains 41 formed by inflation air flowing outwardly through a spaced pair of ports 42 formed in the bottom surface of the structure 40. As the vehicle 1 rocks from side to side during operation over the track 2, the wall structure 40 (which is made of flexible, sheet material) deflects to maintain the structure-to-track clearance substantially constant. This clearance can be adjusted by rotational movement of a board 43 hinged at 44 to the vehicle body and moved relative thereto by a hydraulic jack 45. The jack can be under the control of a gyroscopic device so that the jack is sensitive to tilt. The board 43 contacts the outer, upper surface of the wall structure 40 and movement of the board results in movement of the structure 40 towards and away from the vehicle body. A light spring 49 connects the wall structure 40 to the side of the vehicle body. The spring 49 draws up the wall structure well clear of the roadway when the vehicle is on its wheels and the compressor 12 shut down.

The upper part of the inboard side of the cushion 10 is contained by a flexible nozzle 46 and the lower part thereof by an air curtain 47 formed by air issuing from the nozzle. Air is supplied to the nozzle 46 by way of the duct 13 and a duct tapping 48.

The ends of the cushion 10 are contained, in this example, by air curtains.

With reference now to FIGURES 7 and 8, a modified vehicle 1 is supported by four separate air cushions 10. For control purposes the cushions are supplied with air from separate air compressors 30 so that the pressure of one cushion can be varied relative to another, or the others.

The cushions 10 are formed beneath retractable pads 50. The bottom of each pad is penetrated by a peripheral slot or port 51 and compressed air is supplied from a compressor 30 to the paid interior by a flexible duct 52 where it issues from the port 51 in the form of an annular air curtain 53. Hydraulic jacks 54 serve the twin function of pad damping and retracting means. Hinged links 55 connect the pad 50 to the vehicle body.

Although, in the description above, air has been used for forming cushions and curtains, other gases or mixtures of gases can be used.

We claim:

1. A vehicle for travelling over land surfaces and adapted to operate thereover in two regimes, namely, a first regime in which the vehicle moves along a track and is supported during this movement by at least one cushion of pressurised gas formed and contained beneath the vehicle body, and a second regime in which the vehicle moves along a roadway and is then supported, at least in part, by road wheels mounted on the vehicle body, the vehicle comprising a vehicle body, means for forming and containing at least one gas cushion beneath the vehicle body, guiding means for co-operating with said track so as to constrain movement of the vehicle to a direction along said track, road wheels retractable towards the vehicle body when the vehicle is supported by said cushion, means for retracting said road wheels, means for applying a downwardly-acting external force to said gas cushion means so as to urge said gas cushion means away from the vehicle body, and means for retracting said gas cushion means towards said vehicle body.

2. A vehicle as claimed in claim 1, including a means for forming a curtain of fluid issuing downwardly from the vehicle body for at least partially containing the gas cushion.

3. A vehicle as claimed in claim 1 wherein said guiding means comprise guide wheels which run on said track.

4. A vehicle as claimed in claim 3 wherein said guide wheels are movable by actuating means towards and away from the track.

5. A vehicle according to claim 1 wherein said guide wheels are provided with driving means so that their rotation at least assists in moving the vehicle along said track.

6. A vehicle according to claim 1 wherein the track includes an upright portion and said guiding means comprise at least one subsidiary cushion of pressurised gas formed between the vehicle and the sides of said upright portion.

7. A vehicle according to claim 6 wherein said subsidiary cushion of pressurised gas is maintained by, and laterally bounded, at least in part, by at least one curtain of gas discharged from the vehicle body towards said upright portion.

8. A vehicle according to claim 1 wherein the vehicle includes a linear motor comprising coils mounted on the vehicle body, said motor co-operating with a stationary conductor associated with said track to at least assist in movement of the vehicle along said track.

9. A vehicle for travelling over land surfaces and adapted to operate thereover in two regimes, namely, a first regime in which the vehicle moves along a track and is supported during this movement by at least one cushion of pressurised gas formed and contained beneath the vehicle body, and a second regime in which the vehicle moves along a roadway and is then supported, at least in part, by road wheels mounted on the vehicle body, the vehicle comprising a vehicle body, guiding means for cooperating with said track so as to constrain movement of the vehicle to a direction along said track, gas cushion pad means spaced from and disposed beneath said vehicle body for forming at least one gas cushion beneath the vehicle body, road wheels retractable towards the vehicle body when the vehicle is supported by said gas cushion, means for retracting said road wheels, means for applying a downwardly-acting external force to said cushion pad means, which force tends to urge said cushion pad means away from said vehicle body, and means for retracting said cushion pad means towards said vehicle body.

10. A vehicle for travelling over land surfaces and adapted to operate thereover in two regimes, namely, a first regime in which the vehicle moves along a track and is supported during this movement by at least one cushion of pressurised gas formed and contained beneath the vehicle body, and a second regime in which the vehicle moves along a roadway and is then supported, at least in part by road wheels mounted on the vehicle body, the vehicle comprising a vehicle body, guiding means for cooperating with said track so as to constrain movement of the vehicle to a direction along said track, gas cushion pad means spaced from and disposed beneath said vehicle body for forming at least one gas cushion beneath the vehicle body, road wheels retractable towards the vehicle body when the vehicle is supported by said gas cushion, means for retracting said road wheels, air compressor means disposed within the vehicle body, means including a flexible duct extending between the vehicle body and said cushion pad means for conducting pressurised air from said air compressor means to said cushion pad means, and combined means for damping movement of said cushion pad means relative to the vehicle body and for retracting said cushion pad means towards the vehicle body.

References Cited
UNITED STATES PATENTS

| | | | |
|---|---|---|---|
| 3,125,964 | 3/1964 | Silverman | 104—23 |
| 3,164,103 | 1/1965 | Lathers et al. | 104—134 |
| 3,190,235 | 6/1965 | Bertin et al. | 104—23 |
| 3,198,139 | 8/1965 | Dark | 104—148 |

FOREIGN PATENTS 111,698  5/1962  Pakistan.

ARTHUR L. LA POINT, *Primary Examiner.*

R. M. WOHLFARTH, *Assistant Examiner.*